US011963178B2

(12) United States Patent
Zhang et al.

(10) Patent No.: US 11,963,178 B2
(45) Date of Patent: *Apr. 16, 2024

(54) UPLINK CONTROL CHANNEL TRANSMISSION IN HIGH BAND OPERATION

(71) Applicant: QUALCOMM Incorporated, San Diego, CA (US)

(72) Inventors: Xiaoxia Zhang, San Diego, CA (US); Zhifei Fan, San Diego, CA (US); Ahmed Abdelaziz Ibrahim Abdelaziz Zewail, San Diego, CA (US); Jing Sun, San Diego, CA (US); Juan Montojo, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,883

(22) Filed: Jun. 1, 2023

(65) Prior Publication Data

US 2023/0389029 A1 Nov. 30, 2023

Related U.S. Application Data

(63) Continuation of application No. 17/237,753, filed on Apr. 22, 2021, now Pat. No. 11,706,768.
(Continued)

(51) Int. Cl.
*H04W 72/12* (2023.01)
*H04L 27/26* (2006.01)
(Continued)

(52) U.S. Cl.
CPC ......... *H04W 72/21* (2023.01); *H04L 27/2605* (2013.01); *H04W 72/044* (2013.01)

(58) Field of Classification Search
CPC ... H04L 5/0055; H04L 1/1861; H04L 1/1864; H04L 5/0007; H04L 5/0053;
(Continued)

(56) References Cited

U.S. PATENT DOCUMENTS

2014/0314034 A1 10/2014 Yang et al.
2017/0013610 A1* 1/2017 Lee .................. H04W 72/21
(Continued)

OTHER PUBLICATIONS

International Preliminary Report on Patentability—PCT/US2021/028796 The International Bureau of WIPO—Geneva, Switzerland, dated Nov. 3, 2022.
(Continued)

*Primary Examiner* — Awet Haile
(74) *Attorney, Agent, or Firm* — QUALCOMM Incorporated

(57) ABSTRACT

Various aspects of the present disclosure generally relate to wireless communication. In some aspects, a user equipment may determine an increased bandwidth configuration for an enhanced physical uplink control channel (ePUCCH) based at least in part on an ePUCCH format of the ePUCCH, wherein the increased bandwidth configuration uses a plurality of contiguous resource blocks (RBs) for the ePUCCH; and transmit the ePUCCH using the increased bandwidth configuration. Numerous other aspects are provided.

30 Claims, 8 Drawing Sheets

Related U.S. Application Data

(60) Provisional application No. 63/015,240, filed on Apr. 24, 2020.

(51) Int. Cl.
  *H04W 72/04* (2023.01)
  *H04W 72/044* (2023.01)
  *H04W 72/21* (2023.01)

(58) Field of Classification Search
  CPC ........... H04W 72/0446; H04W 52/146; H04W 16/14; H04W 72/02; H04W 52/58; H04W 72/0413; H04W 72/1268; H04W 74/004
  See application file for complete search history.

(56) References Cited

U.S. PATENT DOCUMENTS

| | | | |
|---|---|---|---|
| 2019/0068423 A1 | 2/2019 | Hwang et al. | |
| 2020/0008156 A1* | 1/2020 | Yin | H04L 1/1858 |
| 2020/0008189 A1 | 1/2020 | Yin et al. | |
| 2020/0128579 A1 | 4/2020 | Talarico et al. | |
| 2020/0228289 A1* | 7/2020 | He | H04L 5/001 |
| 2020/0389260 A1* | 12/2020 | Matsumura | H04W 74/0833 |
| 2021/0029731 A1* | 1/2021 | Kundu | H04W 74/004 |
| 2021/0136749 A1* | 5/2021 | Matsumura | H04W 72/02 |
| 2021/0337575 A1 | 10/2021 | Zhang | |
| 2022/0109531 A1* | 4/2022 | Yin | H04L 5/0055 |

OTHER PUBLICATIONS

International Search Report and Written Opinion—PCT/US2021/028796—ISA/EPO—dated Jul. 13, 2021.

Motorola Mobility, et al., "Short PUCCH for up to 2 bit UCI", 3GPP Draft, R1-1714220, 3GPP TSG RAN WG1 Meeting #90, Short PUCCH for up to 2 bit UCI, 3rd Generation Partnership Project (3GPP), Mobile Competence Centre, 650, Route Des Lucioles, F-06921 Sophia-Antipolis Cedex, France, vol. RAN WG1. No. Prague, Czech Republic, Aug. 21-Aug. 25, 2017, Aug. 20, 2017 (Aug. 20, 2017), XP051317008, 9 Pages, p. 1, paragraph 1, p. 2, paragraph 2.

Qualcomm Incorporated: "UL Signals and Channels for NR-U", 3GPP Draft, 3GPP TSG RAN WG1 Meeting #99, R1-1912937, 3rd Generation Partnership Project (3GPP), Mobile Competence Centre, 650, Route Des Lucioles, F-06921 Sophia-Antipolis Cedex, France, vol. RAN WG1. No. Reno, Nevada, US, Nov. 18-Nov. 22, 2019, Nov. 9, 2019 (Nov. 9, 2019), XP051823700, pp. 1-24, paragraph [03.4] figure 2, p. 8, line 1-line 12, p. 10, paragraph 3.1-p. 14, paragraph 3.4, p. 16. paragraph 3.6.

\* cited by examiner

UPLINK CONTROL CHANNEL TRANSMISSION IN HIGH BAND OPERATION

CROSS-REFERENCE TO RELATED APPLICATION

This application is a continuation of U.S. Non-Provisional application Ser. No. 17/237,753, filed Apr. 22, 2021, and titled "UPLINK CONTROL CHANNEL TRANSMISSION IN HIGH BAND OPERATION," which claims the benefit of U.S. Provisional Application No. 63/015,240, filed Apr. 24, 2020, and titled "UPLINK CONTROL CHANNEL TRANSMISSION IN HIGH BAND OPERATION," both of which are hereby incorporated by reference in there entirety and for all purposes.

FIELD OF THE DISCLOSURE

Aspects of the present disclosure generally relate to wireless communication and to techniques and apparatuses for uplink control channel transmission in high band operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE NR, and other radio access technologies remain useful.

SUMMARY

In some aspects, a method of wireless communication, performed by a user equipment, may include determining an increased bandwidth configuration for an enhanced physical uplink control channel (ePUCCH) based at least in part on an ePUCCH format of the ePUCCH, wherein the increased bandwidth configuration uses a plurality of contiguous resource blocks (RBs) for the ePUCCH; and transmitting the ePUCCH using the increased bandwidth configuration.

In some aspects, a method of wireless communication, performed by a base station, may include determining an increased bandwidth configuration for an ePUCCH based at least in part on an ePUCCH format of the ePUCCH, wherein the increased bandwidth configuration uses a plurality of contiguous RBs for the ePUCCH; and receiving the ePUCCH using the increased bandwidth configuration.

In some aspects, a user equipment for wireless communication may include a memory and one or more processors operatively coupled to the memory. The memory and the one or more processors may be configured to determine an increased bandwidth configuration for an ePUCCH based at least in part on an ePUCCH format of the ePUCCH, wherein the increased bandwidth configuration uses a plurality of contiguous RBs for the ePUCCH; and transmit the ePUCCH using the increased bandwidth configuration.

In some aspects, a base station for wireless communication may include a memory and one or more processors operatively coupled to the memory. The memory and the one or more processors may be configured to determine an increased bandwidth configuration for an ePUCCH based at least in part on an ePUCCH format of the ePUCCH, wherein the increased bandwidth configuration uses a plurality of contiguous RBs for the ePUCCH; and receive the ePUCCH using the increased bandwidth configuration.

In some aspects, a non-transitory computer-readable medium may store one or more instructions for wireless communication. The one or more instructions, when executed by one or more processors of a UE, may cause the one or more processors to determine an increased bandwidth configuration for an ePUCCH based at least in part on an ePUCCH format of the ePUCCH, wherein the increased bandwidth configuration uses a plurality of contiguous RBs for the ePUCCH; and transmit the ePUCCH using the increased bandwidth configuration.

In some aspects, a non-transitory computer-readable medium may store one or more instructions for wireless communication. The one or more instructions, when executed by one or more processors of a base station, may cause the one or more processors to determine an increased bandwidth configuration for an ePUCCH based at least in part on an ePUCCH format of the ePUCCH, wherein the increased bandwidth configuration uses a plurality of contiguous RBs for the ePUCCH; and receive the ePUCCH using the increased bandwidth configuration.

In some aspects, an apparatus for wireless communication may include means for determining an increased bandwidth configuration for an ePUCCH based at least in part on an ePUCCH format of the ePUCCH, wherein the increased bandwidth configuration uses a plurality of contiguous RBs for the ePUCCH; and means for transmitting the ePUCCH using the increased bandwidth configuration.

In some aspects, an apparatus for wireless communication may include means for determining an increased bandwidth configuration for an ePUCCH based at least in part on an ePUCCH format of the ePUCCH, wherein the increased bandwidth configuration uses a plurality of contiguous RBs for the ePUCCH; and means for receiving the ePUCCH using the increased bandwidth configuration.

In some aspects, a method of wireless communication performed by a user equipment (UE) includes receiving configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and transmitting the ePUCCH using the increased bandwidth configuration.

In some aspects, a method of wireless communication performed by a base station includes transmitting configuration information indicating an enhanced physical uplink control channel (ePUCCH) format for an ePUCCH, wherein the ePUCCH is associated with an increased bandwidth configuration based at least in part on the ePUCCH format of the ePUCC, wherein the increased bandwidth configuration uses a plurality of contiguous resource blocks (RBs) for the ePUCCH; and receiving the ePUCCH using the increased bandwidth configuration.

In some aspects, a non-transitory computer-readable medium storing a set of instructions for wireless communication includes one or more instructions that, when executed by one or more processors of a user equipment (UE), cause the UE to: receive configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and transmit the ePUCCH using the increased bandwidth configuration.

In some aspects, a non-transitory computer-readable medium storing a set of instructions for wireless communication includes one or more instructions that, when executed by one or more processors of a base station, cause the base station to: transmit configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and receive the ePUCCH using the increased bandwidth configuration.

In some aspects, an apparatus for wireless communication includes means for receiving configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and means for transmitting the ePUCCH using the increased bandwidth configuration.

In some aspects, an apparatus for wireless communication includes means for transmitting configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and means for receiving the ePUCCH using the increased bandwidth configuration.

In some aspects, a user equipment (UE) for wireless communication includes a memory; and one or more processors, coupled to the memory, configured to: receive configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and transmit the ePUCCH using the increased bandwidth configuration.

In some aspects, a base station for wireless communication includes a memory; and one or more processors, coupled to the memory, configured to: transmit configuration information indicating an enhanced physical uplink control channel (ePUCCH) format for an ePUCCH, wherein the ePUCCH is associated with an increased bandwidth configuration based at least in part on the ePUCCH format of the ePUCC, wherein the increased bandwidth configuration uses a plurality of contiguous resource blocks (RBs) for the ePUCCH; and receive the ePUCCH using the increased bandwidth configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
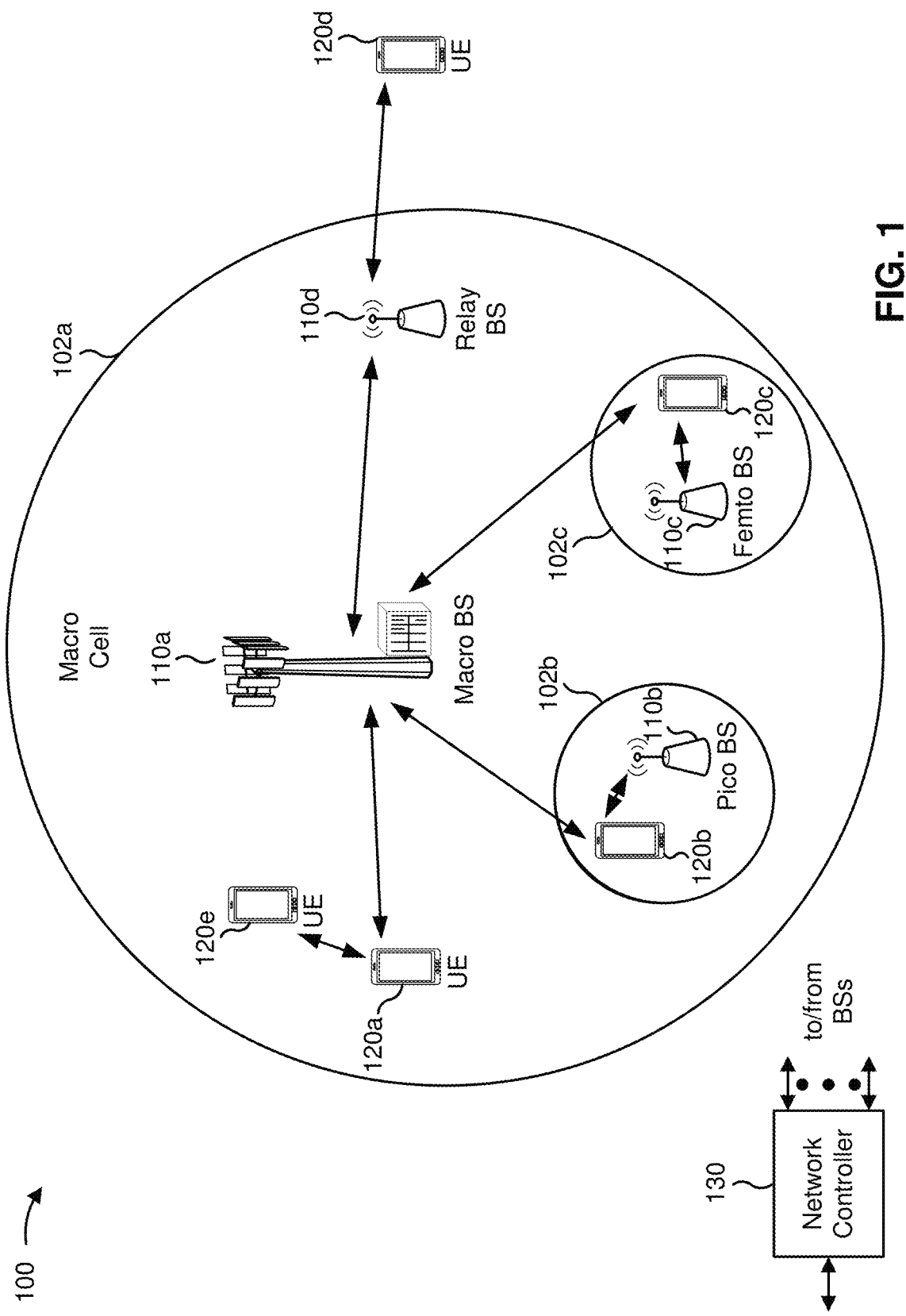
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
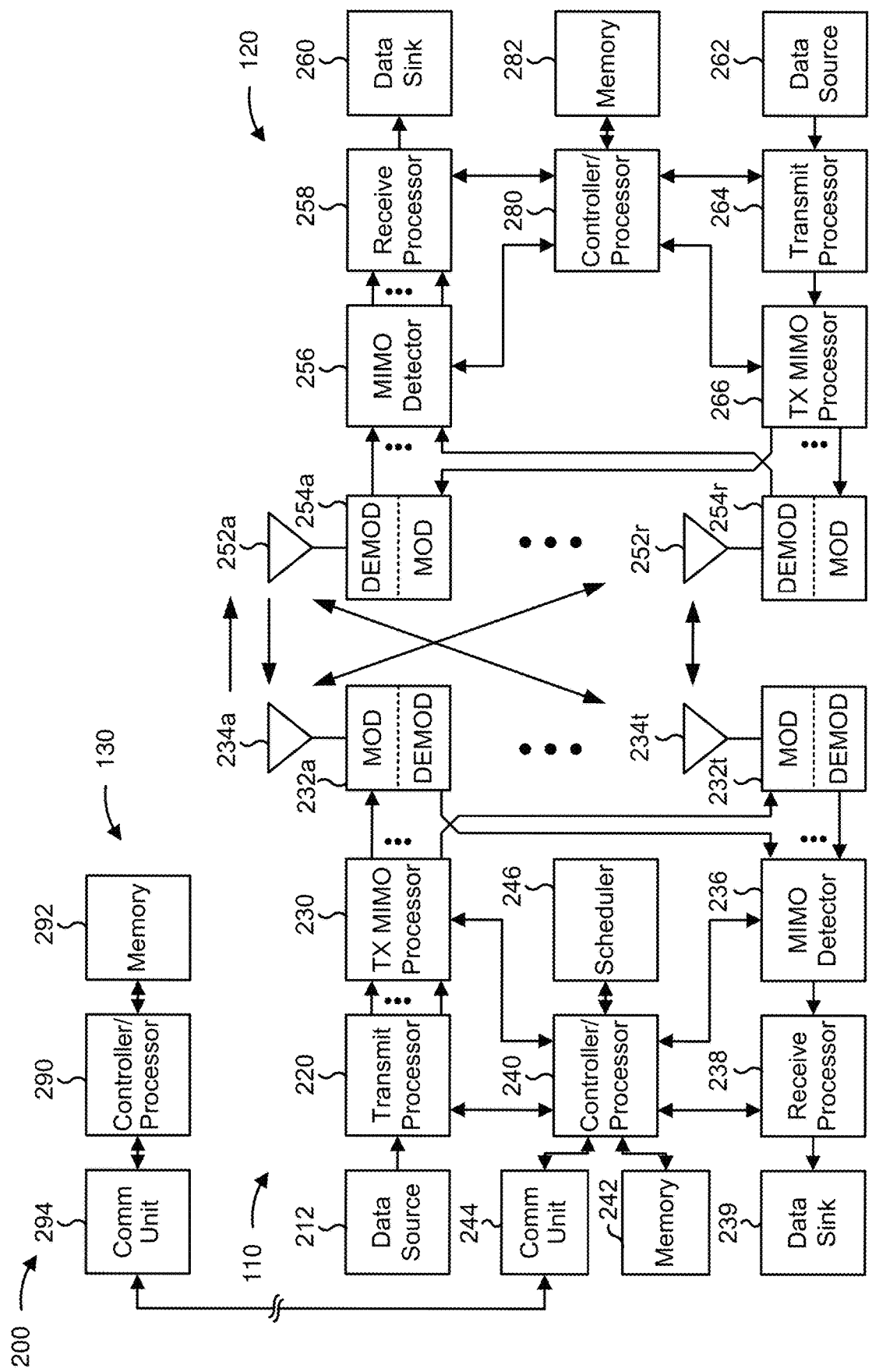
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-8.

Controller/processor 240 of base station 110, controller/processor 280 of UE 120, and/or any other component(s) of FIG. 2 may perform one or more techniques associated with uplink control channel transmission in high band operation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for determining an increased bandwidth configuration for an ePUCCH based at least in part on an ePUCCH format of the ePUCCH, wherein the increased bandwidth configuration uses a plurality of contiguous RBs for the ePUCCH, means for transmitting the ePUCCH using the increased bandwidth configuration, means for performing frequency-domain OCC operations for the plurality of contiguous RBs based at least in part on the increased bandwidth configuration, means for performing time-domain orthogonal cover coding (OCC) for the plurality of contiguous RBs based at least in part on the increased bandwidth configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining an increased bandwidth configuration for an ePUCCH based at least in part on an ePUCCH format of the ePUCCH, wherein the increased bandwidth configuration uses a plurality of contiguous RBs for the ePUCCH, means for receiving the ePUCCH using the increased bandwidth configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A physical uplink control channel (PUCCH) is a physical channel used by a UE to convey control information. A PUCCH may be generated in accordance with a format. Different formats of PUCCH may be used to carry different types of information, may be used in different scenarios, and may be associated with different characteristics. A baseline NR deployment (e.g., enhanced mobile broadband (eMBB)) may be associated with five PUCCH formats (e.g., PUCCH Formats 0, 1, and 4 which may occupy one resource block (RB), and PUCCH Formats 2 and 3 which may occupy a configurable number of resource blocks).

In unlicensed Frequency Range 1 (FR1) bands, enhanced PUCCH (ePUCCH) formats may be used. The ePUCCH formats may include ePUCCH Formats 0, 1, 2, and 3, which are described below. A PUCCH that uses an ePUCCH format is referred to herein as an ePUCCH. In some aspects, an ePUCCH may use an interlace structure, meaning that RBs of the ePUCCH are interlaced across a set of resources. The usage of the interlace structure may increase the usable power (e.g., to a per UE maximum of 23 decibel-milliwatts (dBm)) while conforming with power spectral density (PSD) limits of to 13 dBm per MHz. In some aspects, the interlace may spread out the RBs of the ePUCCH so that each RB can be transmitted at higher power while remaining under the PSD limits.

In some aspects, for ePUCCH Formats 0 and 1, different RBs in the interlace may use different cyclic shifts, and a cyclic shift step size increase (e.g., to a step size of may be used for adjacent RBs in the interlace. In some aspects, for ePUCCH Format 2, frequency-domain orthogonal cover coding (OCC) operations may be performed with OCC lengths of 1, 2, or 4 for user multiplexing. In some aspects, the OCC may be cycled across physical resource blocks (PRBs) of an interface to reduce peak-to-average power ratio (PAPR) and cubic metric (CM) values. In some aspects, for ePUCCH Format 3, user multiplexing of control data associated with the ePUCCH may be based at least in part on pre-discrete Fourier transform (pre-DFT) OCC with block-wise repetition in the time domain, followed by mapping over the RBs across the interlace. User multiplexing for reference signals may be based at least in part on the use of different cyclic shifts of the same base sequence for all multiplexed users. An interlaced set of RBs may be referred to herein as a non-contiguous set of RBs.

A PUCCH in an unlicensed band higher than FR1, such as FR2, may occupy a larger bandwidth than a PUCCH in FR1. In some aspects, with a 120 kHz subcarrier spacing (SCS), a PUCCH's total occupied bandwidth (referring to eMBB PUCCHs) may be 1.44 MHz for PUCCH Formats 0, 1, and 4, and up to approximately 23 MHz with PUCCH Formats 2 and 3. As another example, with a 960 kHz SCS, a PUCCH's total occupied bandwidth may be approximately 12 MHz for PUCCH Formats 0, 1, and 4, and up to approximately 184 MHz for PUCCH Formats 2 and 3. In higher bands, there may be a PSD limit of 23 dBm/MHz with up to 40 dBm Effective Isotropic Radiated Power (EIRP). In some aspects, while a mobile terminal (e.g., a UE) may operate at approximately 23 dBm, some other user terminals, such as CPEs, may operate at a higher EIRP, such as up to the 40 dBm EIRP limit. However, the wider bandwidth of the PUCCH in the higher bands may mean that interlacing, such as the interlacing prescribed by the ePUCCH formats of unlicensed FR1 causes suboptimal resource utilization.

Some techniques and apparatuses described herein provide ePUCCH formats using an increased bandwidth configuration for higher bands, such as FR2, that use a contiguous set of RBs (e.g., without interlacing). In some aspects, an ePUCCH in a higher band may use a sufficiently wide bandwidth that interlacing provides little benefit at the cost of increased channel utilization, and the maximum transmit power requirements of the higher band may be achievable without using interlacing. A configuration for an ePUCCH that uses a contiguous set of RBs may be referred to as an increased bandwidth configuration. Particular examples of increased bandwidth configurations for an unlicensed higher band are described in connection with FIGS. 3-6. Thus, resource utilization, efficiency of PUCCH transmissions, and PAPR in unlicensed higher bands, such as FR2, are improved.

Figure 3:
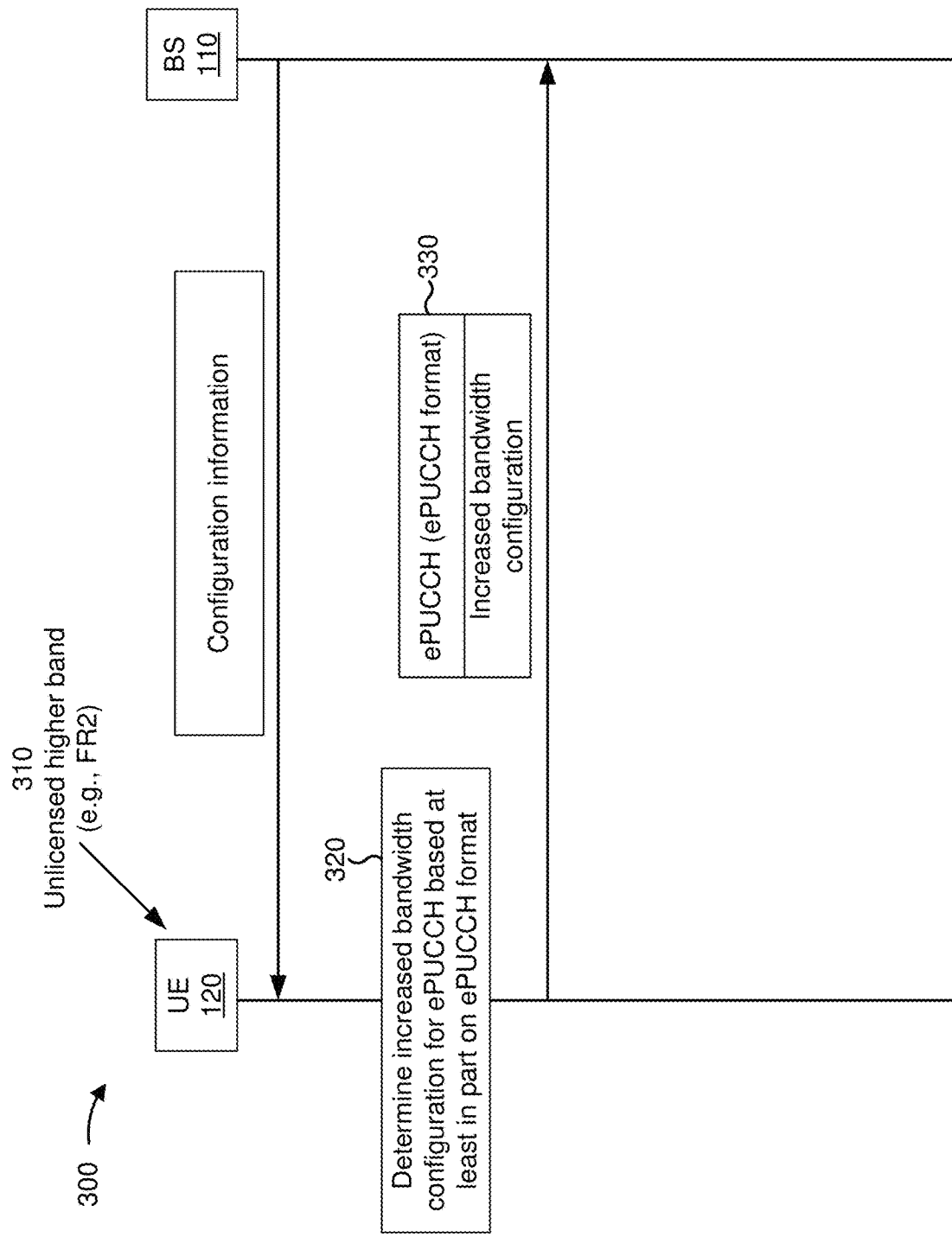
FIG. 3 is a diagram illustrating an example of transmitting an ePUCCH in a higher band using an increased bandwidth configuration, in accordance with the present disclosure.

FIG. 3 is a diagram illustrating an example 300 of transmitting an ePUCCH in a higher band using an increased bandwidth configuration, in accordance with the present disclosure. As shown example 300 includes a UE 120 and a BS 110. As shown by reference number 310, the UE 120 may be associated with a higher band, such as FR2 or a band higher than FR2. For example, the UE 120 may be configured to communicate in the higher band. As another example, the UE 120 may be associated with a frequency higher than 6 GHz. In some aspects, the UE 120 may be associated with an SCS of 120 kHz, 240 kHz, 960 kHz, 1.92 MHz, 3.84 MHz, and/or the like. Furthermore, the higher band may be unlicensed, meaning that the UE 120 may use channel access mechanisms to access the higher band.

As shown by reference number 320, the UE 120 may determine an increased bandwidth configuration for an ePUCCH based at least in part on an ePUCCH format. For example, the UE 120 may receive information (e.g., configuration information, system information, or the like) indicating the ePUCCH format. In some aspects, the information indicating the ePUCCH format may indicate a maximum transmission bandwidth N_RB (in terms of resource blocks) and the ePUCCH format. In some aspects, the UE 120 may use an ePUCCH format based at least in part on the higher band being unlicensed. For example, the UE 120 may determine that an operating band of the UE 120 is a higher band and is unlicensed and may therefore determine to use the ePUCCH format. As another example, the UE 120 may receive information indicating the ePUCCH format based at least in part on the higher band being unlicensed.

The increased bandwidth configuration may use a contiguous set of RBs for the ePUCCH. In some aspects, the increased bandwidth configuration may not use an interlaced waveform for the ePUCCH. As shown by reference number 330, the UE 120 may transmit the ePUCCH in accordance with the ePUCCH format. In some aspects, the UE 120 may transmit the ePUCCH using the increased bandwidth configuration. In some aspects, the UE 120 may perform frequency-domain and/or time-domain OCC based at least in part on the ePUCCH format, as described in more detail in connection with FIGS. 4-6. Thus, the resource efficiency of the ePUCCH may be improved, while a maximum transmit power is achieved.

As indicated above, FIG. 3 is provided as an example. Other examples may differ from what is described with respect to FIG. 3.

Figure 4:
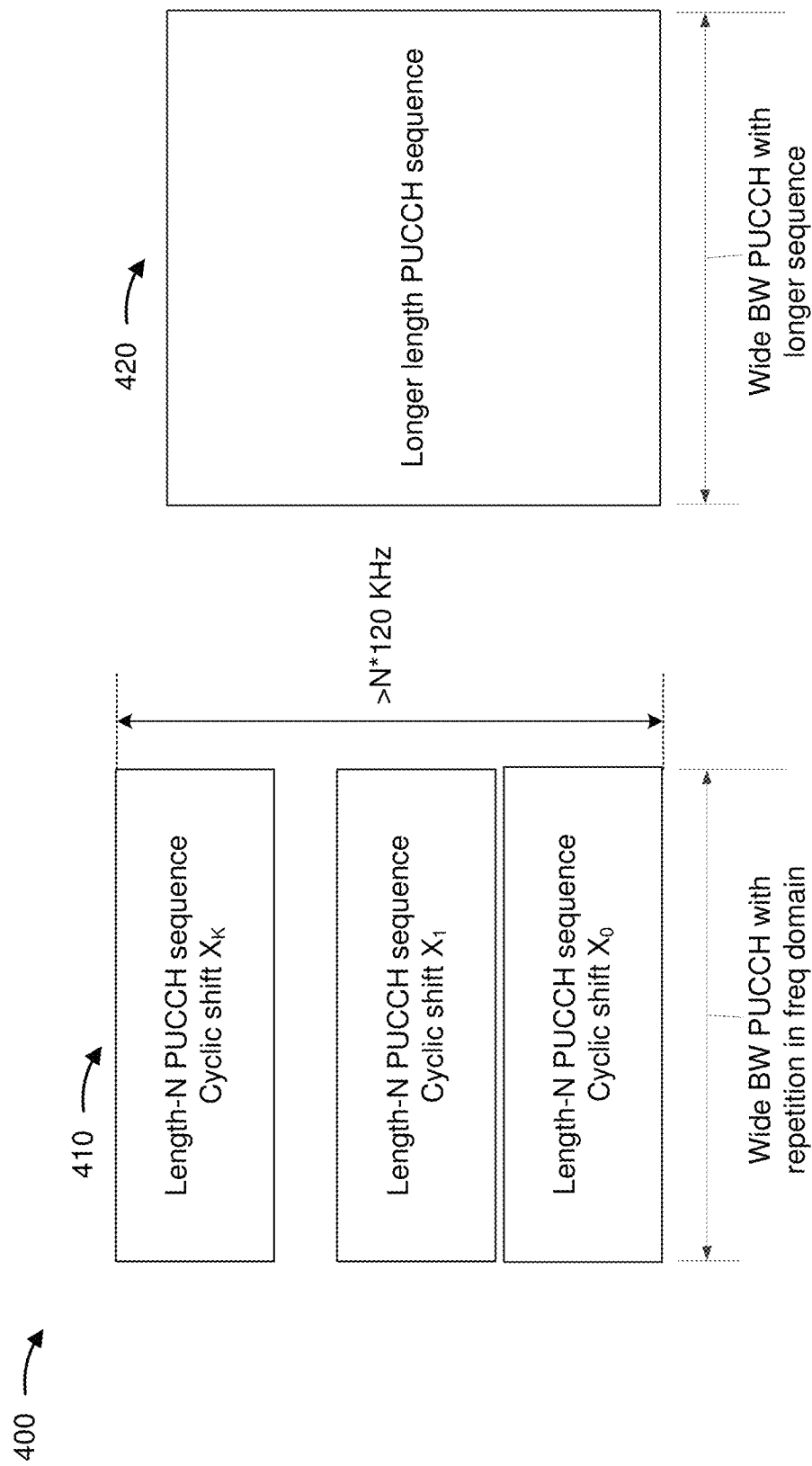
FIG. 4 is a diagram illustrating an example of an increased bandwidth configuration for an ePUCCH Format 0 or 1, in accordance with the present disclosure.

FIG. 4 is a diagram illustrating an example 400 of an increased bandwidth configuration for an ePUCCH Format 0 or Format 1, in accordance with the present disclosure. The increased bandwidth configuration for the ePUCCH Format 0 or 1 may use a contiguous set of RBs. In some aspects, each RB may span more than 1 MHz, so an interlaced waveform may not be needed to achieve acceptable transmit power. Furthermore, aggregating the contiguous set of RBs may achieve lower PAPR than an interlaced waveform. Still further, the usage of contiguous RBs may enable frequency hopping.

In some aspects, the increased bandwidth configuration for the ePUCCH Format 0 or 1 may use an increased sequence length (that is, an extended sequence) relative to an existing PUCCH format defined in NR or to an ePUCCH Format that does not use an increased bandwidth configuration. For example, a longer sequence with M RBs may be used for ePUCCH Format 0 or 1, where M is the number of RBs included in a PUCCH resource. Thus, the sequence may have a length equal to a total number of mapped REs of the PUCCH resource. In some aspects, the increased sequence length for the enhanced PUCCH format 0 or 1 may allow for the increased cyclic shift separation and the increased cyclic shift separation may enable better user multiplexing with PUCCH Format 0 or 1. In some aspects, different cyclic shifts may be used to indicate an acknowledgment (ACK), a negative ACK (NACK), a scheduling request (SR), and so on. This may be particularly beneficial in bands higher than FR1 or FR2, since the channel's coherent bandwidth can be larger than in FR1 or FR2. Additionally, or alternatively, the increased bandwidth configuration for the ePUCCH Format 0 or 1 may use a different cyclic shift on each RB spanned by the increased bandwidth and the cyclic shift on each adjacent RB may be increased by a step size with the starting cyclic shift configured or signaled for the first RB for the ePUCCH format 0 or 1 of a default cyclic shift step size.

In some aspects, the ePUCCH may be split into a plurality of RB groups, such as K RB groups. This is shown by reference number 410. An RB group may include one or more RBs. In this case, and as shown, each RB group may use a cyclic shift value in accordance with a cyclic shift step size. For example, cyclic shifts may be cycled across RBs in accordance with the cyclic shift step size. In some aspects, a first set of RB groups (e.g., 12 RB groups, or a different number depending on the cyclic shift and the number of RBs) may use a first root, and a second set of RB groups may use a second root. In some aspects, the cyclic shift step size may indicate a positive or negative SR. In some aspects, the UE 120 may select a different cyclic shift step size based at least in part on a positive or negative SR. In some aspects, as shown, the ePUCCH may use repetition in the frequency domain. As further shown, the ePUCCH may use a sequence of length N for each RB group of the PUCCH resource. In some aspects, N may be equal to the number of mapped REs per RB of the PUCCH resource. In some aspects, the sequence may be repeated in each RB group (such as with a different cyclic shift $X_0 \ldots X_k$).

Reference number 420 shows an example of an ePUCCH that uses a longer sequence than the example shown by reference number 410. In some aspects, the ePUCCH shown by reference number 420 may use a sequence that spans a plurality of RBs. For example, the sequence may span the ePUCCH (e.g., may have a length equal to the total number of mapped REs of a PUCCH resource of the ePUCCH). In this case, the ePUCCH may use a first root, and a next ePUCCH may use a second root.

As indicated above, FIG. 4 is provided as an example. Other examples may differ from what is described with respect to FIG. 4.

Figure 5:
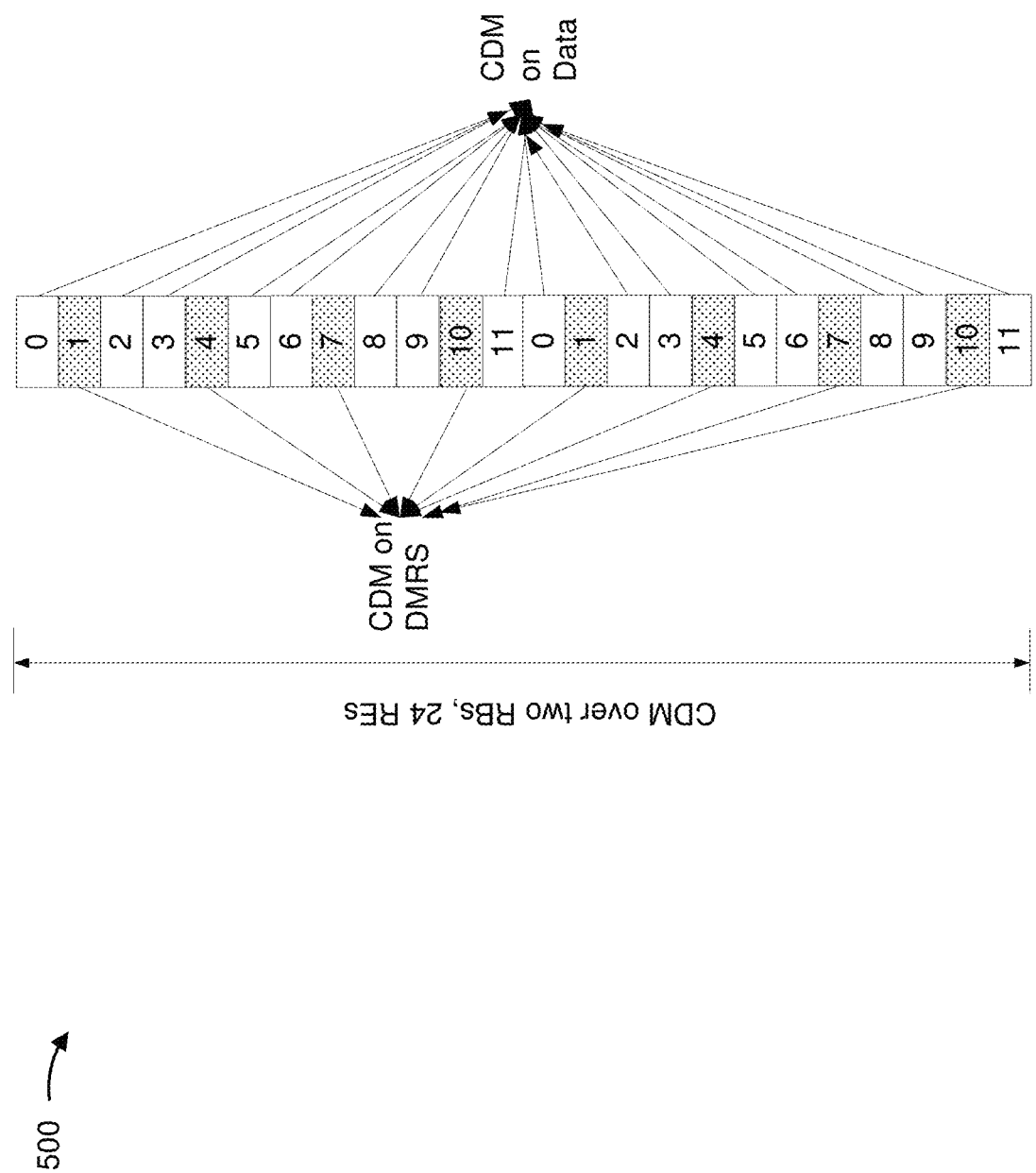
FIG. 5 is a diagram illustrating an example of an increased bandwidth configuration for an ePUCCH Format 2, in accordance with the present disclosure.

FIG. 5 is a diagram illustrating an example 500 of an increased bandwidth configuration for an ePUCCH Format 2, in accordance with the present disclosure. In example 500, 2 RBs (each with 12 resource elements (REs)) are code-division multiplexed (CDM). In some aspects, the increased bandwidth configuration for the ePUCCH Format 2 may use frequency-domain OCC for a plurality of contiguous RBs. In some aspects, the frequency-domain OCC may have a length greater than 4, such as 6, 8, 9, 12, 16, or the like. Here, the frequency-domain OCC has a length of 8. Thus, multiple contiguous RBs may be multiplexed with frequency domain OCC spanning multiple contiguous RBs. This may be particularly useful for a 120 kHz SCS, since the channel may be relatively flat in such an SCS, leading to improved PAPR relative to other SCSs. It should be noted that any number of contiguous RBs can be multiplexed in this fashion.

As indicated above, FIG. 5 is provided as an example. Other examples may differ from what is described with respect to FIG. 5.

Figure 6:
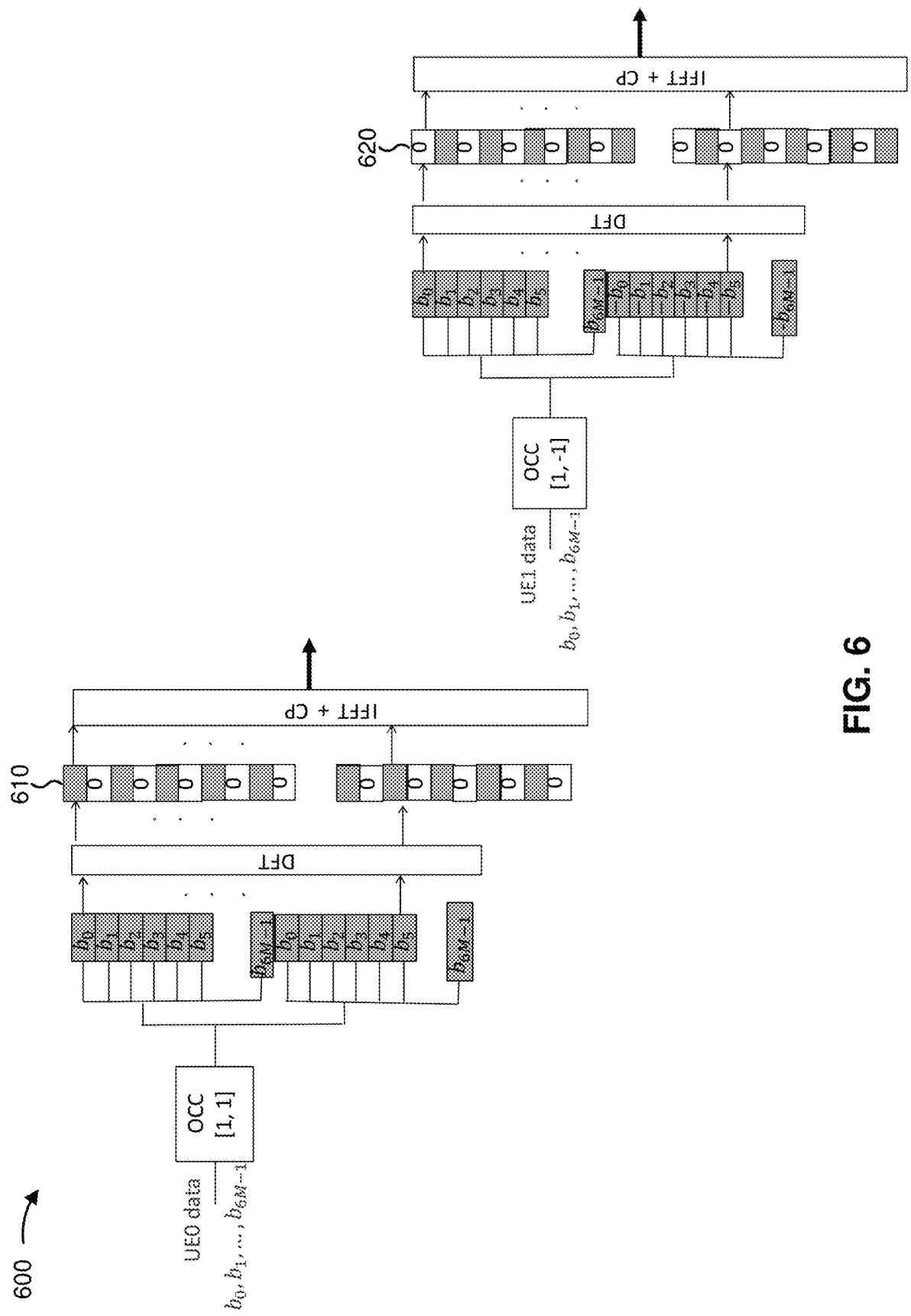
FIG. 6 is a diagram illustrating an example of an increased bandwidth configuration for an ePUCCH Format 3, in accordance with the present disclosure.

FIG. 6 is a diagram illustrating an example 600 of an increased bandwidth configuration such as for an ePUCCH Format 3, in accordance with the present disclosure. The increased bandwidth configuration may use block-wise pre-DFT time-domain OCC operations for M contiguous RBs, where M can include all allocated RBs. In some aspects, the OCC length may be extended beyond 4 (e.g., to 6, 8, 9, or another number), which may be particularly beneficial for the 120 kHz SCS. In example 600, as shown, block-wise pre-DFT time-domain OCC operations are performed for 6M modulation signals [$b_0 \ldots b_{6M-1}$] to be transmitted by a UE0 (e.g., UE 120) and a UE1 (e.g., UE 120). As further shown, block-wise pre-DFT time-domain OCC operations and DFT spreading leads to the UE0 and the UE1 using alternating tones, thus reducing interference between the UE0 and the UE1. For example, the UE0 uses a first tone, a third tone, and so on, as indicated by shading of the tones shown by reference number 610 in the UE0's diagram. Furthermore, the UE1 uses a second tone, a fourth tone, and so on, as indicated by shading of the tones shown by reference number 620 in the UE1's diagram. In some aspects, example 600 may be applicable for an ePUCCH Format 3 or an ePUCCH Format 4.

As indicated above, FIG. 6 is provided as an example. Other examples may differ from what is described with respect to FIG. 6.

Figure 7:
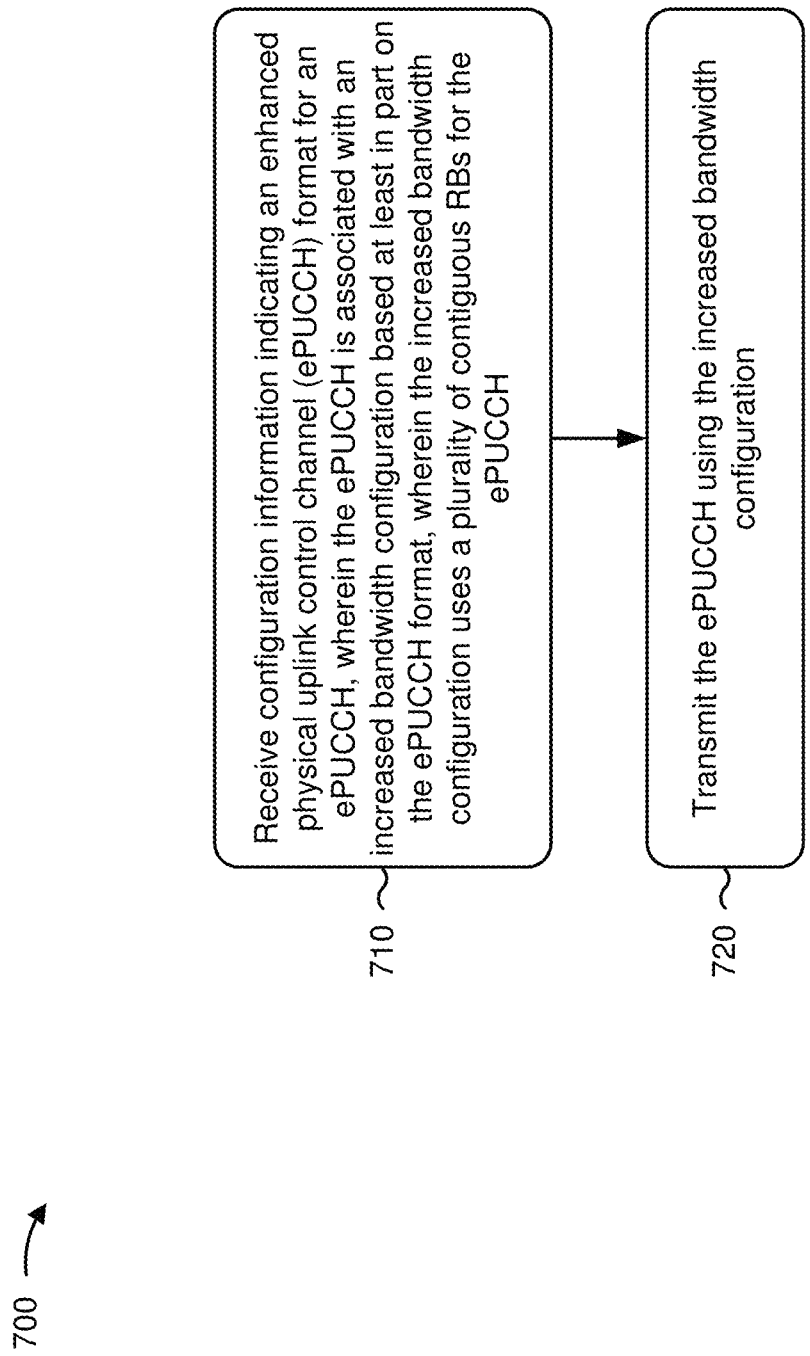
FIG. 7 is a diagram illustrating an example process performed, in some aspects, by a user equipment, in accordance with the present disclosure.

FIG. 7 is a diagram illustrating an example process 700 performed, for example, by a UE, in accordance with the present disclosure. Example process 700 is an example where the UE (e.g., UE 120 and/or the like) performs operations associated with uplink control channel transmission in high band operation.

As shown in FIG. 7, in some aspects, process 700 may include receiving configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous RBs for the ePUCCH (block 710). In some aspects, the UE (e.g., using controller/processor 280, transmit processor 264, TX MIMO processor 266, MOD 254, antenna 252, and/or the like) may receive configuration information, such as via radio resource control (RRC) signaling, medium access control (MAC) signaling, downlink control information (DCI), or a combination thereof. The configuration information may indicate an ePUCCH format for an ePUCCH. The ePUCCH format may be associated with an increased bandwidth configuration, as described above. In some aspects, the increased bandwidth configuration uses a plurality of contiguous RBs for the ePUCCH.

As further shown in FIG. 7, in some aspects, process 700 may include transmitting the ePUCCH using the increased bandwidth configuration (block 720). In some aspects, the UE (e.g., using controller/processor 280, transmit processor 264, TX MIMO processor 266, MOD 254, antenna 252, and/or the like) may transmit the ePUCCH using the increased bandwidth configuration, as described above.

Process 700 may include additional aspects, such as any single aspect or any combination of aspects described below and/or in connection with one or more other processes described elsewhere herein.

In a first aspect, based at least in part on the increased bandwidth configuration, the plurality of contiguous RBs are encoded using an extended sequence relative to a sequence specified by the ePUCCH format for the ePUCCH.

In a second aspect, alone or in combination with the first aspect, based at least in part on the increased bandwidth configuration, the plurality of contiguous RBs are encoded using respective cyclic shifts relative to a cyclic shift specified by the ePUCCH format for the ePUCCH.

In a third aspect, alone or in combination with the first aspect and/or the second aspect, the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

In a fourth aspect, alone or in combination with one or more of the first and third aspects, based at least in part on the increased bandwidth configuration, the plurality of contiguous RBs are grouped into a plurality of groups of contiguous RBs.

In a fifth aspect, alone or in combination with one or more of the first through fourth aspects, the plurality of groups of contiguous RBs are associated with a same root and respective cyclic shift values based at least in part on a cyclic shift step size.

In a sixth aspect, alone or in combination with one or more of the first through fifth aspects, the plurality of groups of contiguous RBs are associated with different roots.

In a seventh aspect, alone or in combination with one or more of the first through sixth aspects, a cyclic shift step size of the ePUCCH is selected based at least in part on whether the ePUCCH is multiplexed with a scheduling request.

In an eighth aspect, alone or in combination with one or more of the first through seventh aspects, the ePUCCH format is an ePUCCH Format 0 or an ePUCCH Format 1.

In a ninth aspect, alone or in combination with one or more of the first through eighth aspects, process 700 includes performing frequency-domain OCC operations for the plurality of contiguous RBs based at least in part on the increased bandwidth configuration.

In a tenth aspect, alone or in combination with one or more of the first through ninth aspects, each of the frequency-domain OCC operations spans one or more contiguous RBs.

In an eleventh aspect, alone or in combination with one or more of the first through tenth aspects, the frequency-domain OCC operations are performed using a length greater than 4.

In a twelfth aspect, alone or in combination with one or more of the first through eleventh aspects, the ePUCCH format is an ePUCCH Format 2.

In a thirteenth aspect, alone or in combination with one or more of the first through twelfth aspects, process 700 includes performing time-domain OCC for the plurality of contiguous RBs based at least in part on the increased bandwidth configuration.

In a fourteenth aspect, alone or in combination with one or more of the first through thirteenth aspects, the time-domain OCC operations comprise block-wise time-domain OCC operations performed before DFT precoding.

In a fifteenth aspect, alone or in combination with one or more of the first through fourteenth aspects, the time-domain OCC operations are performed across all RBs of the plurality of contiguous RBs In a sixteenth aspect, alone or in combination with one or more of the first through fifteenth aspects, the time-domain OCC operations are performed using a length greater than 4.

In a seventeenth aspect, alone or in combination with one or more of the first through sixteenth aspects, the ePUCCH format is an ePUCCH Format 3.

In an eighteenth aspect, alone or in combination with one or more of the first through seventeenth aspects, receiving configuration information indicating an ePUCCH format for an ePUCCH associated with an increased bandwidth configuration is based at least in part on the UE being associated with a frequency range above 6 GHz Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
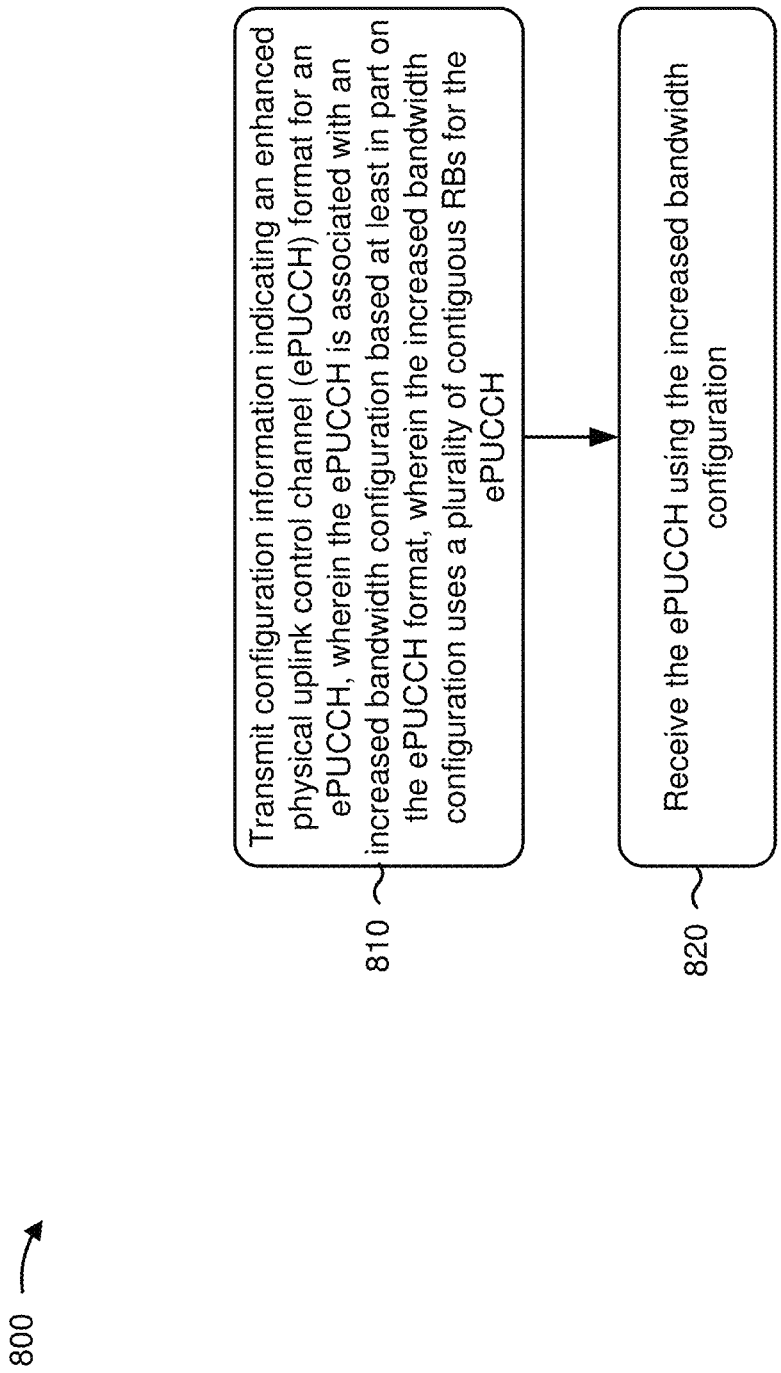
FIG. 8 is a diagram illustrating an example process performed, in some aspects, by a base station, in accordance with the present disclosure.

FIG. 8 is a diagram illustrating an example process 800 performed, in some aspects, by a base station, in accordance with the present disclosure. Example process 800 is an example where the base station (e.g., BS 110 and/or the like) performs operations associated with uplink control channel transmission in high band operation.

As shown in FIG. 8, in some aspects, process 800 may include transmitting configuration information indicating an ePUCCH format for an ePUCCH, wherein the ePUCCH is associated with an increased bandwidth configuration based at least in part on the ePUCCH format of the ePUCCH, wherein the increased bandwidth configuration uses a plurality of contiguous RBs for the ePUCCH (block 810). In some aspects, the base station (e.g., using antenna 234, DEMOD 232, MIMO detector 236, receive processor 238, controller/processor 240, and/or the like) may transmit configuration information (such as via RRC signaling, MAC signaling, DCI, or a combination thereof). The configuration information may indicate an ePUCCH format for an ePUCCH. The ePUCCH may be associated with an increased bandwidth configuration based at least in part on the ePUCCH format of the ePUCCH, as described above. In some aspects, the increased bandwidth configuration uses a plurality of contiguous RBs for the ePUCCH.

As further shown in FIG. 8, in some aspects, process 800 may include receiving the ePUCCH using the increased bandwidth configuration (block 820). In some aspects, the base station (e.g., using antenna 234, DEMOD 232, MIMO detector 236, receive processor 238, controller/processor 240, and/or the like) may receive the ePUCCH using the increased bandwidth configuration, as described above.

Process 800 may include additional aspects, such as any single aspect or any combination of aspects described below and/or in connection with one or more other processes described elsewhere herein.

In a first aspect, based at least in part on the increased bandwidth configuration, the plurality of contiguous RBs are encoded using an extended sequence relative to a sequence specified by the ePUCCH format for the ePUCCH.

In a second aspect, alone or in combination with the first aspect, based at least in part on the increased bandwidth configuration, the plurality of contiguous RBs are encoded using respective cyclic shifts relative to a cyclic shift specified by the ePUCCH format for the ePUCCH.

In a third aspect, alone or in combination with the first aspect and/or the second aspect, the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

In a fourth aspect, alone or in combination with one or more of the first and third aspects, based at least in part on the increased bandwidth configuration, the plurality of contiguous RBs are grouped into a plurality of groups of contiguous RBs.

In a fifth aspect, alone or in combination with one or more of the first through fourth aspects, the plurality of groups of contiguous RBs are associated with a same root and respective cyclic shift values based at least in part on a cyclic shift step size.

In a sixth aspect, alone or in combination with one or more of the first through fifth aspects, the plurality of groups of contiguous RBs are associated with different roots.

In a seventh aspect, alone or in combination with one or more of the first through sixth aspects, a cyclic shift step size of the ePUCCH is selected based at least in part on whether the ePUCCH is multiplexed with a scheduling request.

In an eighth aspect, alone or in combination with one or more of the first through seventh aspects, the ePUCCH format is an ePUCCH Format 0 or an ePUCCH Format 1.

In a ninth aspect, alone or in combination with one or more of the first through eighth aspects, the ePUCCH uses frequency-domain OCC operations for the plurality of contiguous RBs based at least in part on the increased bandwidth configuration.

In a tenth aspect, alone or in combination with one or more of the first through ninth aspects, each of the frequency-domain OCC operations spans one or more contiguous RBs.

In an eleventh aspect, alone or in combination with one or more of the first through tenth aspects, the frequency-domain OCC operations are performed using a length greater than 4.

In a twelfth aspect, alone or in combination with one or more of the first through eleventh aspects, the ePUCCH format is an ePUCCH Format 2.

In a thirteenth aspect, alone or in combination with one or more of the first through twelfth aspects, the ePUCCH uses time-domain orthogonal cover coding (OCC) operations for the plurality of contiguous RBs based at least in part on the increased bandwidth configuration.

In a fourteenth aspect, alone or in combination with one or more of the first through thirteenth aspects, the time-domain OCC operations comprise block-wise time-domain OCC operations performed before DFT precoding.

In a fifteenth aspect, alone or in combination with one or more of the first through fourteenth aspects, the time-domain OCC operations are performed using a length greater than 4.

In a sixteenth aspect, alone or in combination with one or more of the first through fifteenth aspects, the ePUCCH format is an ePUCCH Format 3.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: receiving configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and transmitting the ePUCCH using the increased bandwidth configuration.

Aspect 2: The method of Aspect 1, wherein, based at least in part on the increased bandwidth configuration, the plurality of contiguous RBs are encoded using an extended sequence relative to a sequence specified by the ePUCCH format for the ePUCCH.

Aspect 3: The method of Aspect 1, wherein, based at least in part on the increased bandwidth configuration, the plurality of contiguous RBs are encoded using respective cyclic shifts relative to a cyclic shift specified by the ePUCCH format for the ePUCCH.

Aspect 4: The method of Aspect 3, wherein the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

Aspect 5: The method of Aspect 1, wherein, based at least in part on the increased bandwidth configuration, the plurality of contiguous RBs are grouped into a plurality of groups of contiguous RBs.

Aspect 6: The method of Aspect 5, wherein the plurality of groups of contiguous RBs are associated with a same root and respective cyclic shift values based at least in part on a cyclic shift step size.

Aspect 7: The method of Aspect 5, wherein the plurality of groups of contiguous RBs are associated with different roots.

Aspect 8: The method of Aspect 5, wherein a cyclic shift step size of the ePUCCH is selected based at least in part on whether the ePUCCH is multiplexed with a scheduling request.

Aspect 9: The method of Aspect 1, wherein the ePUCCH format is an ePUCCH Format 0 or an ePUCCH Format 1.

Aspect 10: The method of Aspect 1, further comprising: performing frequency-domain orthogonal cover coding (OCC) operations for the plurality of contiguous RBs based at least in part on the increased bandwidth configuration.

Aspect 11: The method of Aspect 10, where each of the frequency-domain OCC operations spans one or more contiguous RBs.

Aspect 12: The method of Aspect 10, wherein the frequency-domain OCC operations are performed using a length greater than 4.

Aspect 13: The method of Aspect 10, wherein the ePUCCH format is an ePUCCH Format 2.

Aspect 14: The method of Aspect 1, further comprising: performing time-domain orthogonal cover coding (OCC) operations for the plurality of contiguous RBs based at least in part on the increased bandwidth configuration.

Aspect 15: The method of Aspect 14, wherein the time-domain OCC operations comprise block-wise time-domain OCC operations performed before discrete Fourier transform (DFT) precoding.

Aspect 16: The method of Aspect 14, wherein the time-domain OCC operations are performed across all RBs of the plurality of contiguous RBs.

Aspect 17: The method of Aspect 14, wherein the time-domain OCC operations are performed using a length greater than 4.

Aspect 18: The method of Aspect 1, wherein receiving configuration information indicating an ePUCCH format for an ePUCCH associated with an increased bandwidth configuration is based at least in part on the UE being associated with a frequency range above 6 GHz.

Aspect 19: A method of wireless communication performed by a base station, comprising: transmitting configuration information indicating an enhanced physical uplink control channel (ePUCCH) format for an ePUCCH, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH; and receiving the ePUCCH using the increased bandwidth configuration.

Aspect 20: The method of Aspect 19, wherein, based at least in part on the increased bandwidth configuration, the plurality of contiguous RBs are encoded using an extended sequence relative to a sequence specified by the ePUCCH format for the ePUCCH.

Aspect 21: The method of Aspect 19, wherein, based at least in part on the increased bandwidth configuration, the plurality of contiguous RBs are encoded using respective cyclic shifts relative to a cyclic shift specified by the ePUCCH format for the ePUCCH.

Aspect 22: The method of Aspect 21, wherein the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

Aspect 23: The method of Aspect 19, wherein, based at least in part on the increased bandwidth configuration, the plurality of contiguous RBs are grouped into a plurality of groups of contiguous RBs.

Aspect 24: The method of Aspect 23, wherein the plurality of groups of contiguous RBs are associated with a same root and respective cyclic shift values based at least in part on a cyclic shift step size.

Aspect 25: The method of Aspect 19, wherein the ePUCCH uses frequency-domain orthogonal cover coding (OCC) operations for the plurality of contiguous RBs based at least in part on the increased bandwidth configuration.

Aspect 26: The method of Aspect 19, wherein the ePUCCH uses time-domain orthogonal cover coding (OCC) operations for the plurality of contiguous RBs based at least in part on the increased bandwidth configuration.

Aspect 27: An apparatus for wireless communication at a device, comprising a processor; memory coupled with the processor; and instructions stored in the memory and executable by the processor to cause the apparatus to perform the method of one or more Aspects of Aspects 1-26.

Aspect 28: A device for wireless communication, comprising a memory and one or more processors coupled to the memory, the memory and the one or more processors configured to perform the method of one or more Aspects of Aspects 1-26.

Aspect 29: An apparatus for wireless communication, comprising at least one means for performing the method of one or more Aspects of Aspects 1-26.

Aspect 30: A non-transitory computer-readable medium storing code for wireless communication, the code comprising instructions executable by a processor to perform the method of one or more Aspects of Aspects 1-26.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the tem' "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors, coupled to the one or more memories, configured to:
        receive configuration information indicating an enhanced physical uplink control channel (ePUCCH) format for an ePUCCH, wherein the ePUCCH format comprises a ePUCCH Format 0 or an ePUCCH Format 1, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH, and wherein the plurality of contiguous RBs are associated with a frequency range above 24.25 GHz;
        encode the plurality of contiguous RBs using an extended sequence relative to a sequence specified by the ePUCCH Format 0 or the ePUCCH Format 1 for the ePUCCH; and
        transmit the ePUCCH using the increased bandwidth configuration.

2. The UE of claim 1, wherein the plurality of contiguous RBs are associated with a frequency range above 52.6 GHz.

3. The UE of claim 2, wherein the plurality of contiguous RBs are associated with a frequency range of 57 GHz to 7.1 GHz.

4. The UE of claim 1, wherein the plurality of contiguous RBs are associated with an unlicensed frequency band.

5. The UE of claim 1, wherein, based at least in part on the increased bandwidth configuration, the plurality of contiguous RBs are encoded using respective cyclic shifts relative to a cyclic shift specified by the ePUCCH format for the ePUCCH.

6. The UE of claim 5, wherein the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

7. The UE of claim 1, wherein the plurality of contiguous RBs are grouped into a plurality of groups of contiguous RBs.

8. The UE of claim 7, wherein the plurality of groups of contiguous RBs are associated with a same root and respective cyclic shift values based at least in part on a cyclic shift step size.

9. The UE of claim 7, wherein the plurality of groups of contiguous RBs are associated with different roots.

10. The UE of claim 7, wherein a cyclic shift step size of the ePUCCH is selected based at least in part on whether the ePUCCH is multiplexed with a scheduling request.

11. A method of wireless communication performed by a user equipment (UE), comprising:
    receiving configuration information indicating an enhanced physical uplink control channel (ePUCCH) format for an ePUCCH, wherein the ePUCCH format comprises a ePUCCH Format 0 or an ePUCCH Format 1, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH, and wherein the plurality of contiguous RBs are associated with a frequency range above 24.25 GHz;
    encoding the plurality of contiguous RBs using an extended sequence relative to a sequence specified by the ePUCCH Format 0 or the ePUCCH Format 1 for the ePUCCH; and
    transmitting the ePUCCH using the increased bandwidth configuration.

12. The method of claim 11, wherein the plurality of contiguous RBs are associated with a frequency range above 52.6 GHz.

13. The method of claim 12, wherein the plurality of contiguous RBs are associated with a frequency range of 57 GHz to 7.1 GHz.

14. The method of claim 11, wherein the plurality of contiguous RBs are associated with an unlicensed frequency band.

15. The method of claim 11, wherein, based at least in part on the increased bandwidth configuration, the plurality of contiguous RBs are encoded using respective cyclic shifts relative to a cyclic shift specified by the ePUCCH format for the ePUCCH.

16. The method of claim 15, wherein the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

17. The method of claim 11, wherein the plurality of contiguous RBs are grouped into a plurality of groups of contiguous RBs.

18. The method of claim 17, wherein the plurality of groups of contiguous RBs are associated with a same root and respective cyclic shift values based at least in part on a cyclic shift step size.

19. The method of claim 17, wherein the plurality of groups of contiguous RBs are associated with different roots.

20. The method of claim 17, wherein a cyclic shift step size of the ePUCCH is selected based at least in part on whether the ePUCCH is multiplexed with a scheduling request.

21. A non-transitory computer-readable medium storing a set of instructions for wireless communication, the set of instructions comprising:
one or more instructions that, when executed by one or more processors of a user equipment (UE), cause the UE to:
receive configuration information indicating an enhanced physical uplink control channel (ePUCCH) format for an ePUCCH, wherein the ePUCCH format comprises a ePUCCH Format 0 or an ePUCCH Format 1, wherein the ePUCCH is associated with an increased bandwidth configuration based at least in part on the ePUCCH format of the ePUCCH, wherein the increased bandwidth configuration uses a plurality of contiguous resource blocks (RBs) for the ePUCCH, and wherein the plurality of contiguous RBs are associated with a frequency range above 24.25 GHz;
encode the plurality of contiguous RBs using an extended sequence relative to a sequence specified by the ePUCCH Format 0 or the ePUCCH Format 1 for the ePUCCH; and
transmit the ePUCCH using the increased bandwidth configuration.

22. The non-transitory computer-readable medium of claim 21, wherein the plurality of contiguous RBs are associated with a frequency range above 52.6 GHz.

23. The non-transitory computer-readable medium of claim 22, wherein the plurality of contiguous RBs are associated with a frequency range of 57 GHz to 7.1 GHz.

24. The non-transitory computer-readable medium of claim 21, wherein the plurality of contiguous RBs are associated with an unlicensed frequency band.

25. The non-transitory computer-readable medium of claim 21, wherein, based at least in part on the increased bandwidth configuration, the plurality of contiguous RBs are encoded using respective cyclic shifts relative to a cyclic shift specified by the ePUCCH format for the ePUCCH.

26. The non-transitory computer-readable medium of claim 25, wherein the respective cyclic shifts are different for each RB of the plurality of contiguous RBs, and wherein the respective cyclic shifts are derived based at least in part on a cyclic shift step size relative to the cyclic shift specified by the ePUCCH format for the ePUCCH.

27. The non-transitory computer-readable medium of claim 21, wherein the plurality of contiguous RBs are grouped into a plurality of groups of contiguous RBs.

28. The non-transitory computer-readable medium of claim 27, wherein the plurality of groups of contiguous RBs are associated with a same root and respective cyclic shift values based at least in part on a cyclic shift step size.

29. The non-transitory computer-readable medium of claim 27, wherein the plurality of groups of contiguous RBs are associated with different roots.

30. The non-transitory computer-readable medium of claim 27, wherein a cyclic shift step size of the ePUCCH is selected based at least in part on whether the ePUCCH is multiplexed with a scheduling request.

* * * * *